(12) United States Patent
Zhao et al.

(10) Patent No.: US 10,513,265 B2
(45) Date of Patent: Dec. 24, 2019

(54) METHODS AND SYSTEM FOR HYBRID VEHICLE REGENERATIVE BRAKING

(71) Applicant: Ford Global Technologies, LLC, Dearborn, MI (US)

(72) Inventors: Yanan Zhao, Ann Arbor, MI (US); Joseph Jay Torres, Dearborn, MI (US); Ming Lang Kuang, Canton, MI (US); Lucian Lippok, Cologne (DE); Hai Yu, Woodbury, MN (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 15/457,695

(22) Filed: Mar. 13, 2017

(65) Prior Publication Data
US 2018/0257656 A1 Sep. 13, 2018

(51) Int. Cl.
*B60W 10/08* (2006.01)
*B60W 10/16* (2012.01)
(Continued)

(52) U.S. Cl.
CPC ......... *B60W 30/18127* (2013.01); *B60K 6/48* (2013.01); *B60K 6/52* (2013.01); *B60K 6/547* (2013.01); *B60K 17/20* (2013.01); *B60L 3/108* (2013.01); *B60L 7/10* (2013.01); *B60L 50/16* (2019.02); *B60L 50/61* (2019.02); *B60T 8/172* (2013.01); *B60W 10/08* (2013.01); *B60W 10/16* (2013.01); *B60W 10/184* (2013.01); *B60W 20/00* (2013.01); *F16H 3/093* (2013.01); *B60K 2006/4808* (2013.01); *B60T 2210/12* (2013.01); *B60T 2260/04* (2013.01); *B60T 2270/604* (2013.01); *B60T 2270/606* (2013.01); *B60W 2510/12* (2013.01); *B60W 2540/12* (2013.01); *B60W 2550/148* (2013.01); *B60W 2710/083* (2013.01); *B60W 2710/12* (2013.01); *B60W 2710/125* (2013.01); *B60W 2720/406* (2013.01); *F16H 3/006* (2013.01); *F16H 48/36* (2013.01); *F16H 2003/0931* (2013.01); *F16H 2048/364* (2013.01); *Y02T 10/6221* (2013.01)

(58) Field of Classification Search
CPC .... B60W 10/08; B60W 10/16; B60W 10/184; B60W 20/00; B60W 30/18127; B60L 7/10
See application file for complete search history.

(56) References Cited

U.S. PATENT DOCUMENTS 4,974,875 A 12/1990 Sugasawa et al.
6,681,180 B2 1/2004 Bevly et al.
(Continued)

OTHER PUBLICATIONS

Zhao, Yanan, et al., "Methods and System for a Hybrid Vehicle," U.S. Appl. No. 15/457,771, filed Mar. 13, 2017, 75 pages.
(Continued)

*Primary Examiner* — Edwin A Young
(74) *Attorney, Agent, or Firm* — Kelley David McCoy Russell LLP

(57) ABSTRACT

Methods and systems are provided for operating a driveline of a hybrid vehicle that includes an internal combustion engine, an electric machine, and a transmission are described. In one example, regenerative torque and torque of an electronically controlled differential clutch are adjusted to increase utilization of a vehicle's kinetic energy.

19 Claims, 8 Drawing Sheets

(51) Int. Cl.
*B60W 30/18* (2012.01)
*B60K 6/48* (2007.10)
*B60K 6/547* (2007.10)
*B60K 17/16* (2006.01)
*B60L 7/10* (2006.01)
*B60T 8/172* (2006.01)
*B60W 20/00* (2016.01)
*F16H 3/093* (2006.01)
*B60K 6/52* (2007.10)
*B60W 10/184* (2012.01)
*B60L 3/10* (2006.01)
*B60L 50/61* (2019.01)
*B60L 50/16* (2019.01)
*F16H 3/00* (2006.01)
*F16H 48/36* (2012.01)

(56) References Cited

U.S. PATENT DOCUMENTS

| | | | |
|---|---|---|---|
| 6,959,971 | B2 | 11/2005 | Tsunehara |
| 7,774,103 | B2 | 8/2010 | Deng et al. |
| 9,297,455 | B2 | 3/2016 | Li |
| 2002/0163250 | A1 | 11/2002 | Huls et al. |
| 2005/0099146 | A1* | 5/2005 | Nishikawa ............... B60K 6/44 318/63 |
| 2005/0103551 | A1* | 5/2005 | Matsuno ................. B60K 6/48 180/243 |
| 2009/0017985 | A1* | 1/2009 | Choi ...................... B60K 6/485 477/68 |
| 2014/0297120 | A1 | 10/2014 | Cotgrove |
| 2014/0375115 | A1* | 12/2014 | Ajiro ........................ B60L 3/10 303/152 |
| 2015/0298702 | A1 | 10/2015 | Reinisch et al. |

OTHER PUBLICATIONS

Fodor, Michael Glenn, et al., "Methods and System Providing Vehicle Drift," U.S. Appl. No. 15/457,815, filed Mar. 13, 2017, 59 pages.

Ortmann, Walter Joseph, et al., "Methods and System for Operating a Hybrid Vehicle," U.S. Appl. No. 15/457,860, filed Mar. 13, 2017, 55 pages.

\* cited by examiner

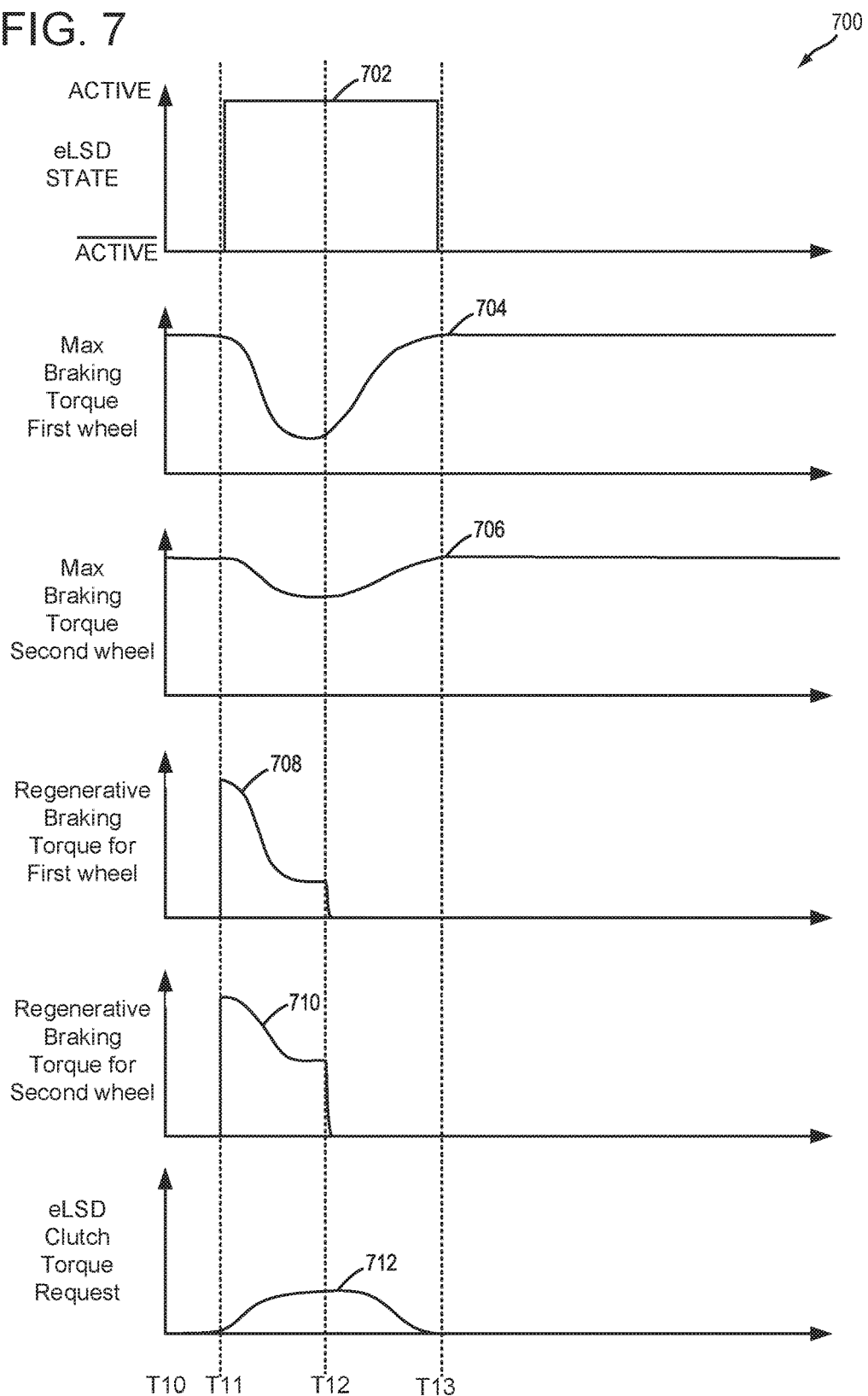

METHODS AND SYSTEM FOR HYBRID VEHICLE REGENERATIVE BRAKING

FIELD

The present description relates generally to methods and systems for controlling a driveline of a hybrid vehicle. The methods and systems may be particularly useful for hybrid vehicles that include an electronic limited slip differential.

BACKGROUND/SUMMARY

A hybrid vehicle may provide regenerative and friction braking to slow the hybrid vehicle. An electric machine is applied during regenerative braking to slow the hybrid vehicle and convert the hybrid vehicle's kinetic energy into electrical energy. Friction brakes may be utilized when the hybrid vehicle's regenerative braking capacity alone is insufficient to stop the hybrid vehicle. However, utilizing friction brakes may waste the hybrid vehicle's kinetic energy by converting the hybrid vehicle's kinetic energy into heat instead of electrical energy. Therefore, it may be desirable to activate and utilize regenerative braking whenever it may be desirable to slow the hybrid vehicle. Nevertheless, sometimes a hybrid vehicle may be presented with few opportunities to apply regenerative braking. Further, even if regenerative braking may be applied, driving conditions may limit use of regenerative braking to reduce the possibility of wheel slip. Consequently, it may be desirable to develop methods and systems that may improve a hybrid vehicle's capacity to reduce vehicle speed and recharge vehicle batteries via regenerative braking.

The inventors herein have recognized the above-mentioned issues and have developed a driveline method, comprising: adjusting a clutch torque of a differential's clutch in response to a difference between a second wheel braking torque and the first wheel threshold braking torque; and adjusting an electric machine regenerative torque in response to a first wheel braking torque and the first wheel braking torque and the clutch torque.

By adjusting a torque of an electrically controlled differential and electric machine regenerative torque, it may be possible to increase efficiency of converting a vehicle's kinetic energy into electrical energy even when opportunities to utilize regenerative braking may be low. In particular, the torque of the electrically controlled differential may be adjusted while a vehicle is negotiating a turn so that transfer of torque from vehicle wheels to an electric machine may be maximized without inducing wheel locking. Further, in examples where an axle controls torque of the clutch in a differential, electric machine regenerative torque may be adjusted in response to the torque of the clutch in the differential.

The present description may provide several advantages. In particular, the approach may improve efficiency of converting a vehicle's kinetic energy into electrical energy. Further, the approach may improve driving dynamics. In addition, the approach may provide benefits during vehicle cornering and while a vehicle is operating on a road that has different coefficients of friction for a first drive wheel and a second drive wheel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 is a prophetic regenerative braking sequence according to the method of FIG. 5.

DETAILED DESCRIPTION

Figure 4:
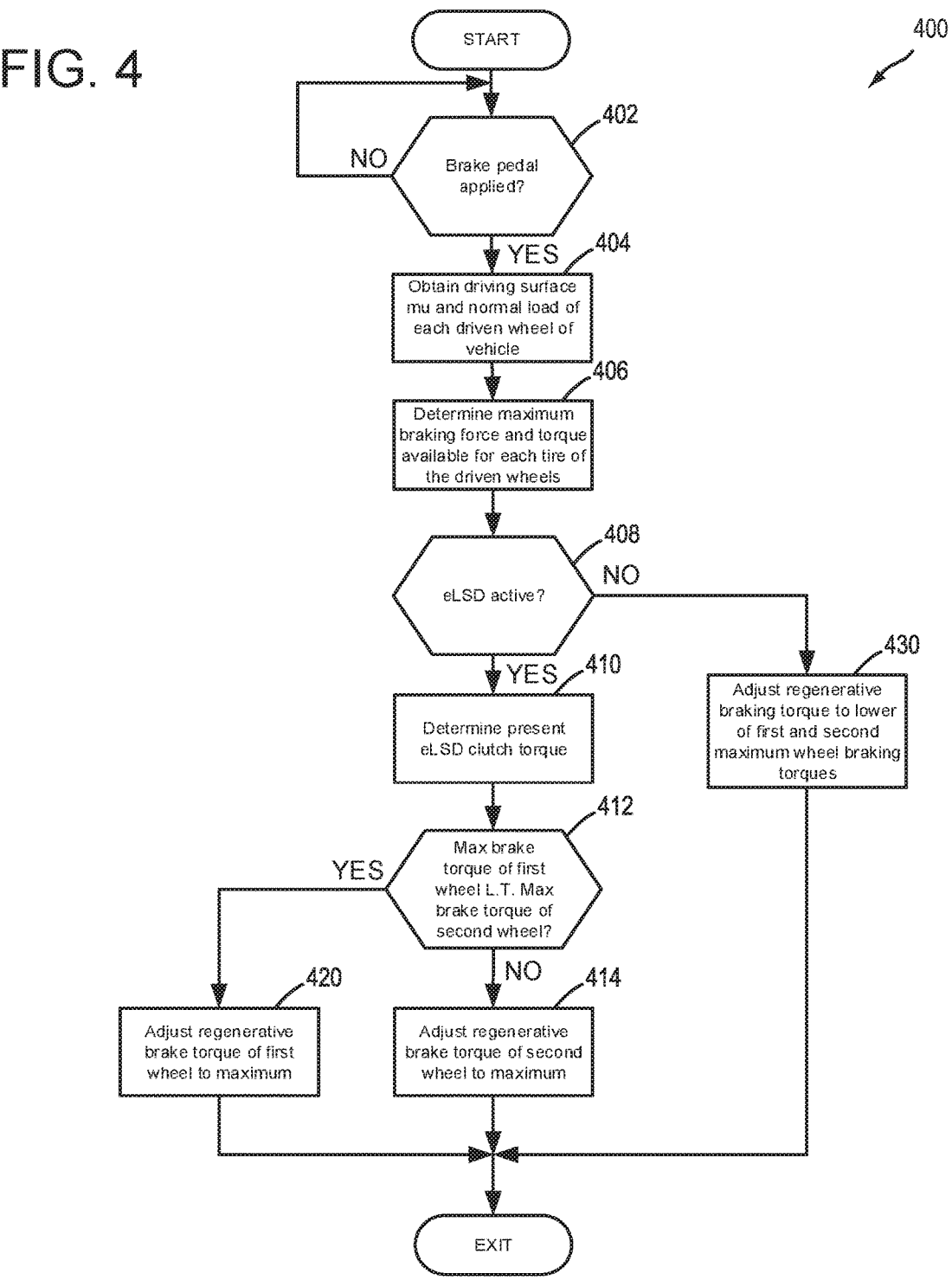
FIG. 4 is a flowchart of a first method to operate a hybrid vehicle driveline.
Figure 5:
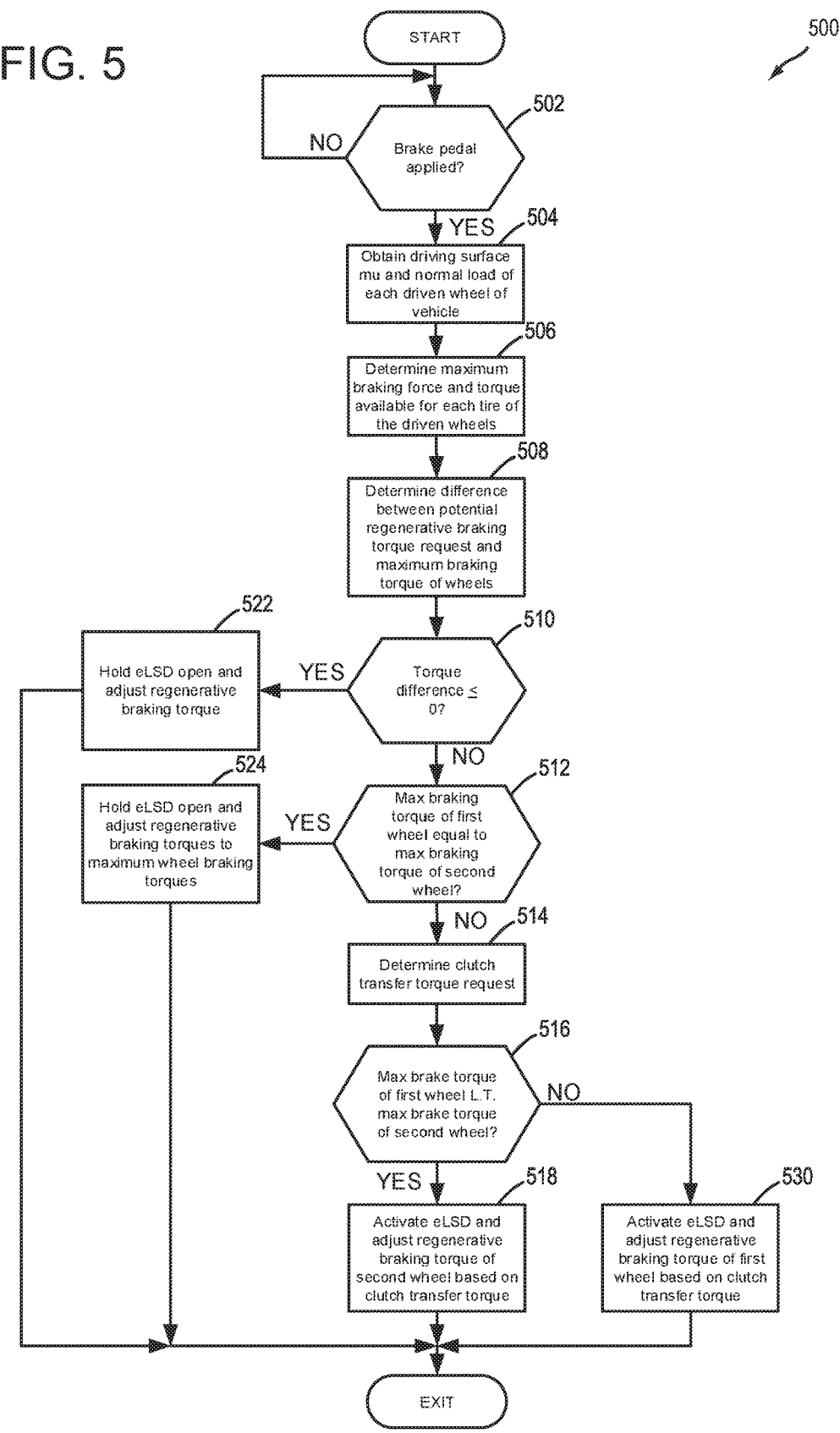
FIG. 5 is a flowchart of a second method to operate a hybrid vehicle driveline.
Figure 6:
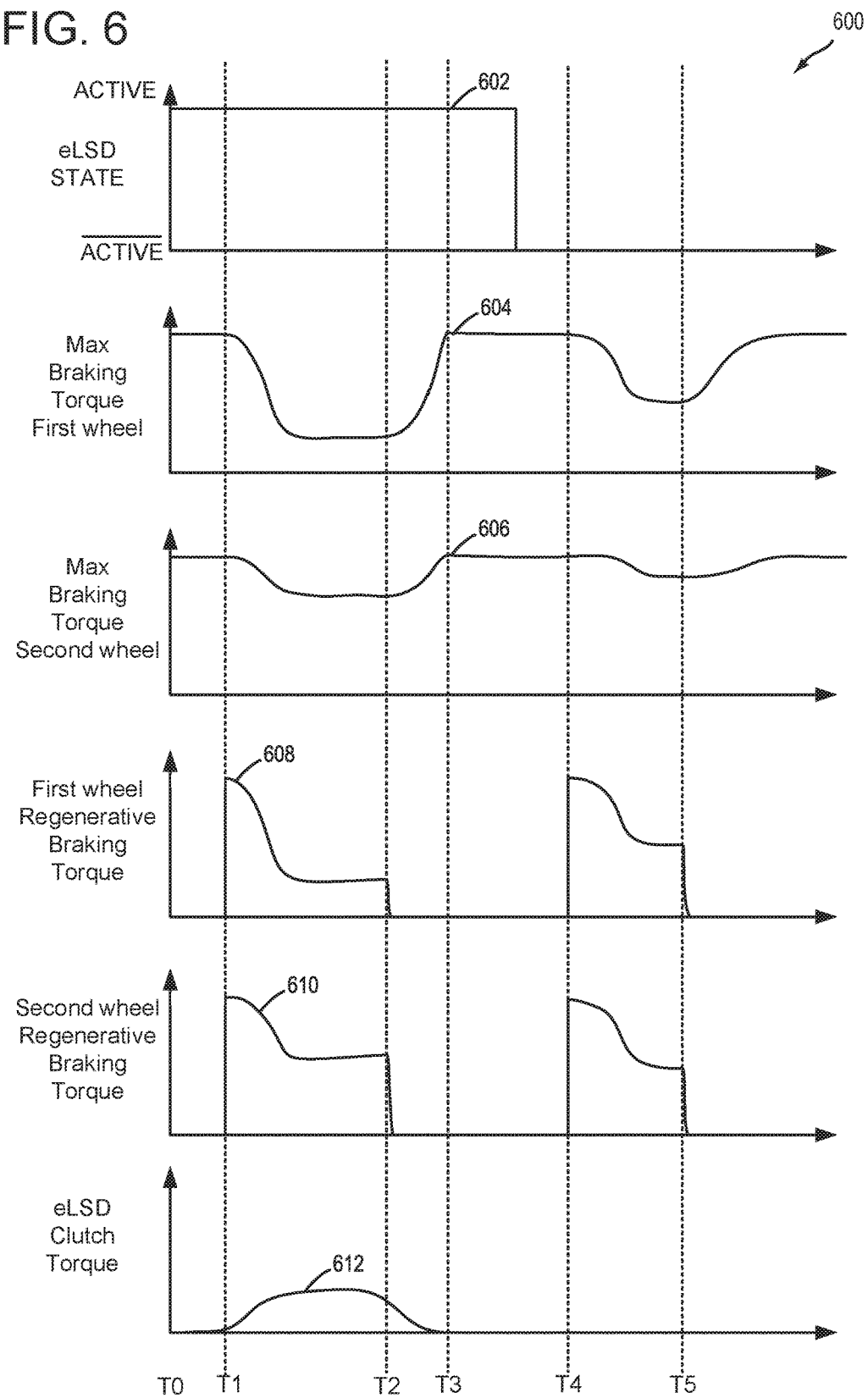
FIG. 6 is a prophetic regenerative braking sequence according to the method of FIG. 4.

The following description relates to systems and methods for operating a driveline of a hybrid vehicle. FIGS. 1A-3 show an example hybrid vehicle system that includes a driveline with a motor, an integrated starter/generator, a dual clutch transmission, and a rear drive unit with an electric machine that is positioned downstream of the dual clutch transmission. FIG. 4 shows a first method for operating an electric machine of a driveline with an electrically controlled limited slip differential. FIG. 5 shows a second method for controlling an electrical controlled limited slip differential and an electric machine. Prophetic regenerative braking sequences according to the method of FIGS. 4 and 5 are shown in FIGS. 6 and 7.

Figure 1A:
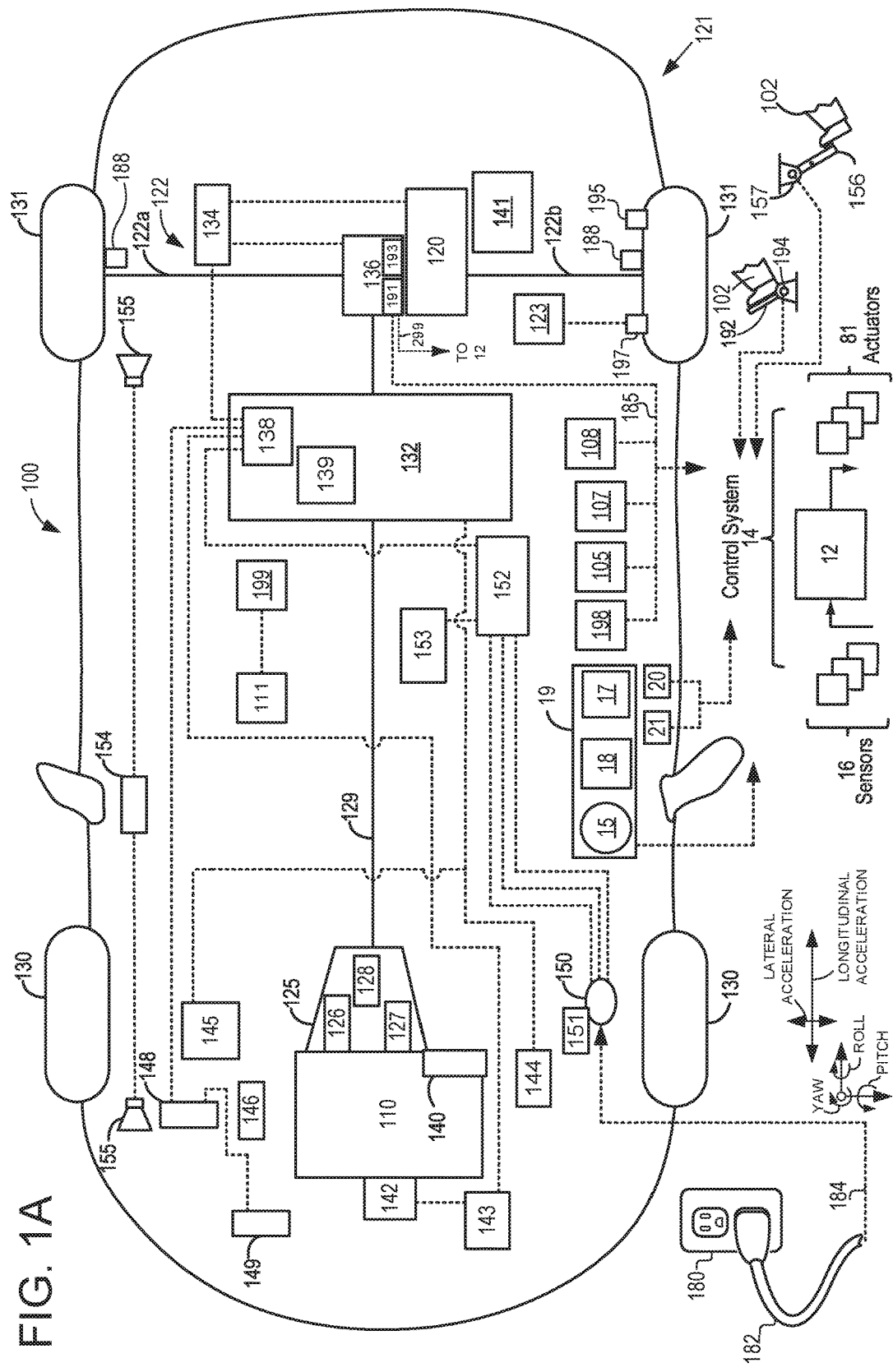
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a torque of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131. Rear drive unit 136 may be directly coupled to electric machine 120 and axle 122.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard electric energy storage device 132. Furthermore, electric machine 120 may provide a generator function to convert engine output or the vehicle's kinetic energy into electrical energy, where the electrical energy may be stored at energy storage device 132 for later use by the electric machine 120 or integrated starter/generator 142. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 132 may include one or more batteries and/or capacitors.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging electric energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12. Normal load or force applied to driven wheels 131 may be determined via load sensors 188.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130. Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147a may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130 via an axle that may include an electronic limited slip differential as shown at 136, 191, and 193.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
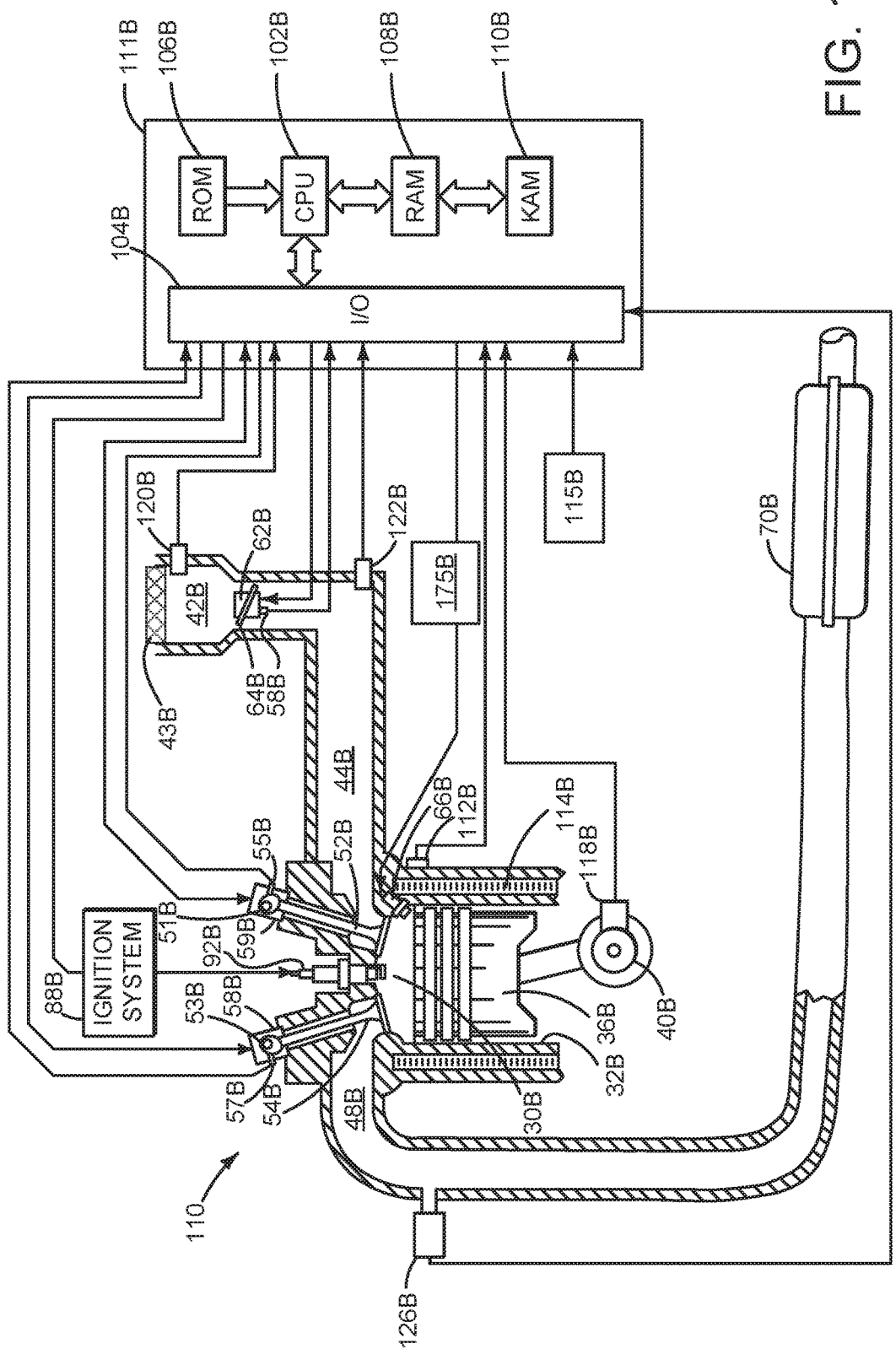
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
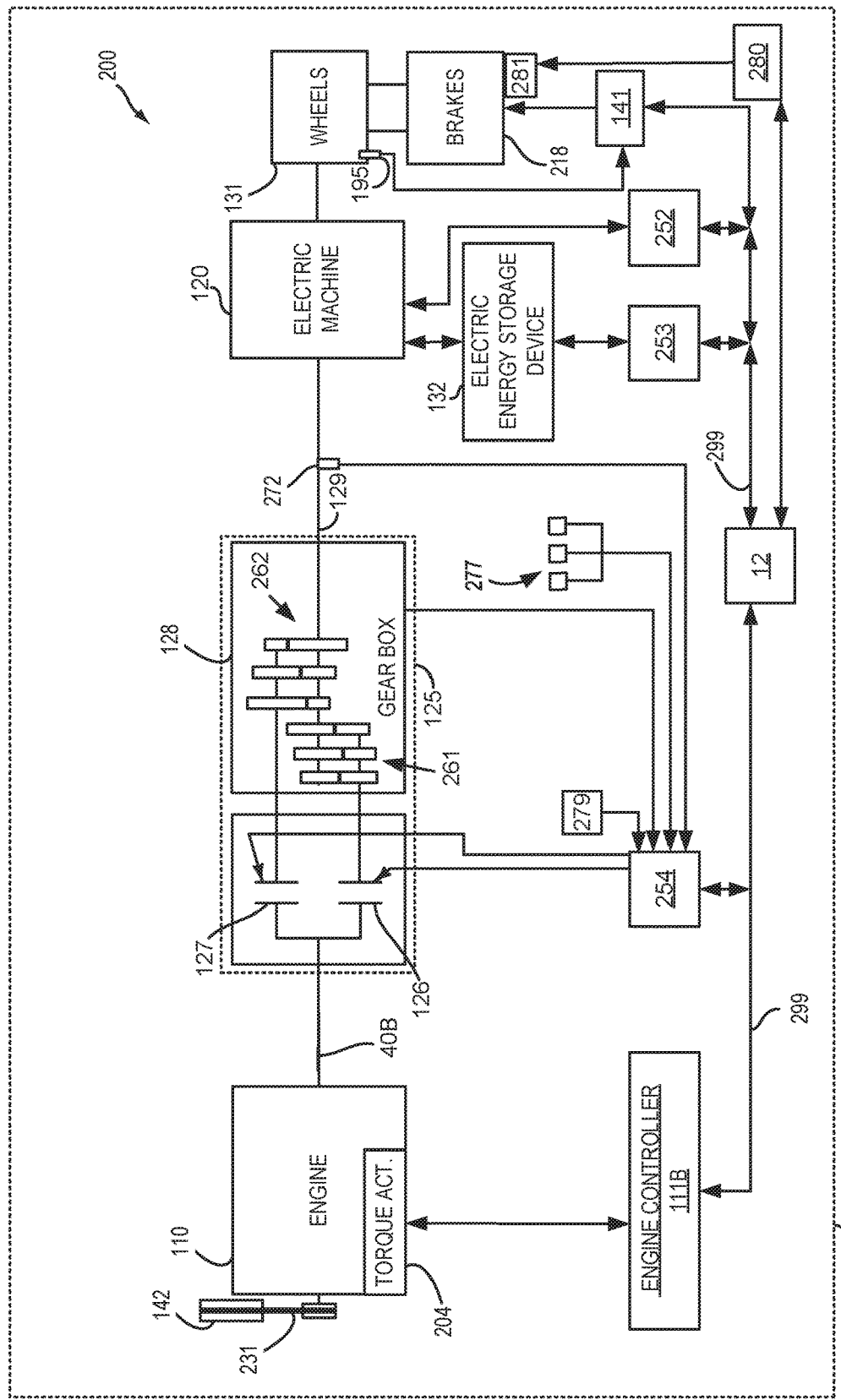
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIG. 1A-B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125.

Transmission 125 is positioned upstream of electric machine 120, and BISG 142 may be positioned upstream of engine 110, or downstream of engine 110 and upstream of transmission 125.

Figure 3:
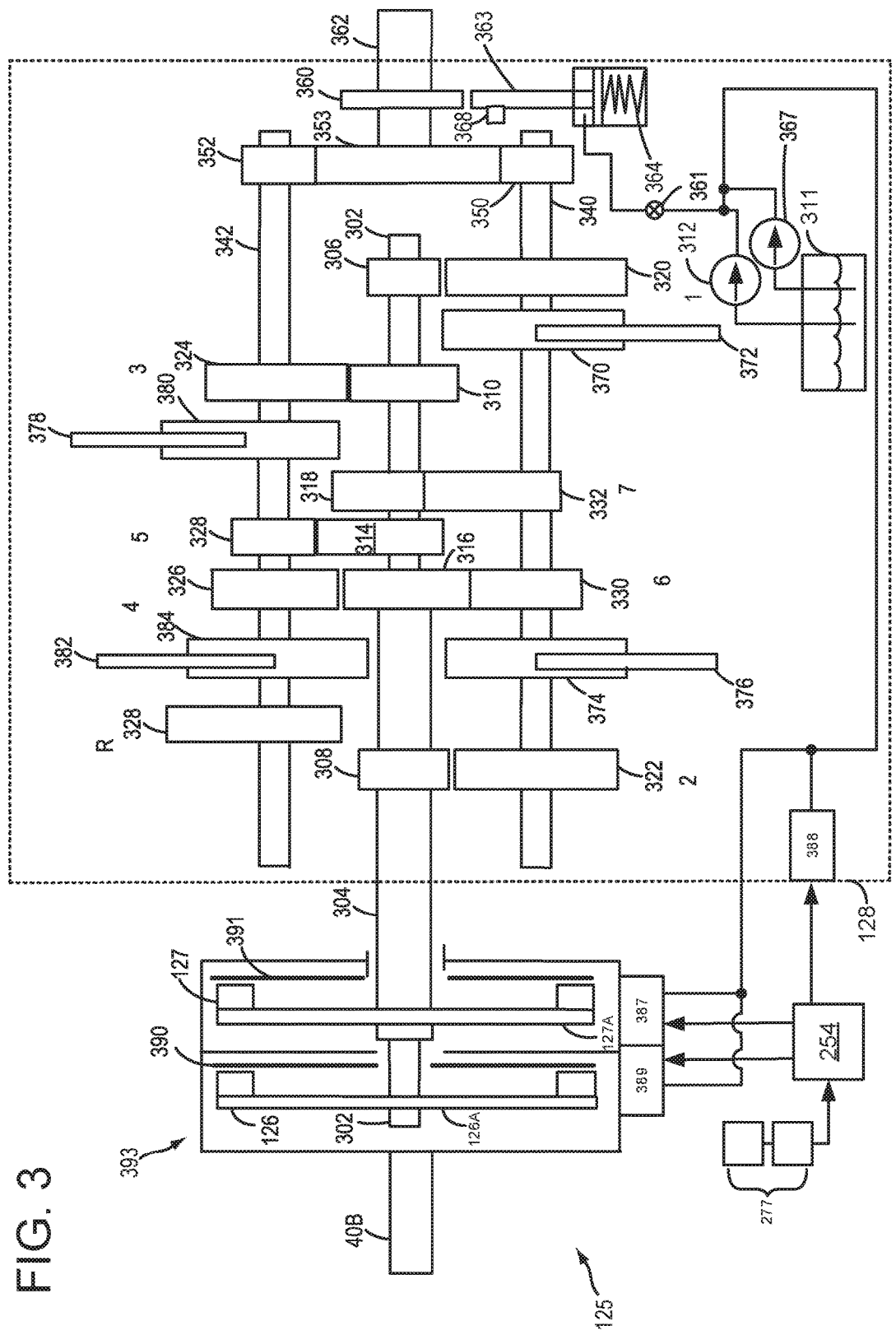
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 340 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor and fork position sensors to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 370, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, the system of FIGS. 1A-3 provides for a system, comprising: an engine; a dual clutch transmission coupled to the engine; an axle including an electrically controlled limited slip differential, the axle coupled to the dual clutch transmission; an electric machine directly coupled to the axle; and a controller including executable instructions stored in non-transitory memory to command a torque of the limited slip differential in response to a requested electric machine regenerative torque and a threshold braking torque for a first wheel. The system further comprises additional instructions to command the torque to zero in response to the requested electric machine regenerative torque minus a value of two multiplied by the threshold braking torque for the first wheel being less than zero. The system further comprises additional instructions to command the torque to zero in response to the threshold braking torque for the first wheel being substantially equal to a threshold braking torque for a second wheel.

The system includes where the first threshold braking torque and the second threshold braking torque are a function of a road surface coefficient of friction, where the first threshold braking torque is a function of a normal load on the first wheel, and where the second threshold braking torque is a function of a normal load on the second wheel. The system includes where the regeneration torque is based on output torque of an engine.

Referring now to FIG. 4, a first example method for operating a hybrid driveline to increase conversion of a vehicle's kinetic energy into electrical energy is shown. The method of FIG. 4 may be incorporated into and may cooperate with the system of FIGS. 1A-3. Further, at least portions of the method of FIG. 4 may be incorporated as executable instructions stored in non-transitory memory while other portions of the method may be performed via a controller transforming operating states of devices and actuators in the physical world.

At 402, method 400 judges if a vehicle brake pedal is applied or if an autonomous controller is requesting vehicle braking. Method 400 may judge that a vehicle brake pedal is applied in response to a position of a brake pedal. Method 400 may also judge if vehicle braking is being requested in response to a value of a parameter in controller memory. If method 400 judges that a brake pedal is applied, the answer is yes and method 400 proceeds to 404. Otherwise, the answer is no and method 400 returns to 402.

At 404, method 400 determines a coefficient of friction (mu) between a tire and a road surface. In addition, method 400 determines normal forces for each wheel that may participate in regenerative braking. For example, wheels 131 shown in FIG. 1A may participate in regenerative braking since wheels 131 are shown in mechanical communication with electric machine 120 via axle 122. In one example, the coefficient of friction between the tire and the road surface may be determined as is described in U.S. Pat. No. 4,794,538 which is hereby fully incorporated by reference for all purposes.

The normal forces for wheels 131 are the forces each wheel imparts to the road surface in a direction perpendicular to the road surface. In one example, the normal forces are determined via strain gauges located at each driven wheel. Alternatively, the normal forces for driven wheels including a predetermined number of passengers and fuel may be stored to memory and adjusted as a function of lateral and longitudinal acceleration to determine normal forces applied to driven wheels. For example, normal force applied to a left rear wheel may be mathematically described as:

$$LR_N = f(Vm, Lat\_a, Long\_a, Hcg, Wb, Tw)$$

where $LR_N$ is left rear wheel normal load, $f$ is a function that outputs a value of left rear wheel normal load, argument Vm is vehicle mass, argument Lat_a is lateral acceleration as determined via a sensor, argument Long_a is longitudinal acceleration as determined via a sensors, argument Hcg is height of center of gravity as empirically determined and stored to memory, argument Wb is the vehicle's wheel base as measured, and argument Tw is the vehicle's track width as measured. Values in the function $f$ may be empirically determined and stored to memory. The right rear wheel normal load may be determined in a similar way.

Method 400 proceeds to 406 after determining the coefficient of friction and the normal forces for each wheel that may participate in regenerative braking by transferring vehicle kinetic energy to the electric machine.

At 406, method 400 determines a maximum braking torque available for each wheel that may participate in regenerative braking (e.g., driven wheels 131 of FIG. 1A). The maximum braking torque for a left rear driven wheel may be referred to as a first threshold braking torque (Tq_brakeMax1). The maximum braking torque for a right rear driven wheel may be referred to as a second threshold braking torque (Tq_brakeMax2). In one example, method 400 determines the first threshold braking torque as a function of mu and left rear wheel normal load. The first threshold braking torque may be expressed mathematically as:

$$LR_{Max\_brake} = f(LR_N, mu, R)$$

where $LR_{Max\_brake}$ is left rear wheel maximum or high threshold brake torque, $f$ is a function that outputs a value of left rear wheel maximum braking torque, argument $LR_N$ is left rear wheel normal load, argument mu is a coefficient of friction determined as previously discussed, and argument R is tire radius. Values in the function $f$ may be empirically determined and stored to memory. The right rear wheel maximum braking torque may be determined via:

$$RR_{Max\_brake} = f(RR_N, mu, R)$$

where $RR_{Max\_brake}$ is right rear wheel maximum or high threshold brake torque, argument $RR_N$ is right rear wheel normal load, argument mu is a coefficient of friction determined as previously described, and argument R is tire radius. The remaining variables are as previously described. Method 400 proceeds to 408 after determining the first threshold braking torque and the second threshold braking torque.

At 408, method 400 judges if the electric limited slip differential (eLSD) (e.g., a limited slip differential with an electrically operated clutch) is active. In one example, method 400 may judge that the eLSD is active when a torque of an electrically operated differential clutch (e.g., an amount of torque the differential clutch is requested to transfer from its input side to its output side) is non-zero. The electrically operated differential clutch torque increases as a pressure applied to close the clutch increases. Pressure applied to the electrically operated differential clutch may be increased via sending an electrical signal to the electrically operated differential clutch. The electrical signal may increase hydraulic pressure supplied to close the electrically operated differential clutch in some examples. If method 400 judges that the electrically operated differential clutch is active, the answer is yes and method 400 proceeds to 410. Otherwise, the answer is no and method 400 proceeds to 430.

At 430, method 400 determines an amount of regenerative braking applied via a first half shaft to the lesser of the first threshold braking torque determined at 406 and the second threshold braking torque determined at 406. The amount of regenerative braking determined for the second haft shaft is equal to the regenerative braking torque applied to the first half shaft. The electric machine in the driveline (e.g., 120 of FIG. 1A) provides a regenerative braking torque equal to the regenerative braking torque applied to the first half shaft plus the regenerative braking torque applied to the second half shaft. Mathematically the relationships may be expressed as:

$$Tq\_regen1 = min(Tq\_brakeMax1, Tq\_brakeMax2);$$

$$Tq\_regen2 = Tq\_regen1$$

$$Tq\_totRegen = Tq\_regen1 + Tq\_regen2$$

where Tq_regen1 is the regenerative torque applied to the first wheel, Tq_regen2 is the regenerative torque applied to the second wheel, Tq_brakeMax1 is the maximum braking torque of the first wheel, Tq_brakeMax2 is the maximum braking torque of the second wheel, min is a function that selects a minimum value (e.g., lower of the argument values) from the arguments and it assumes both arguments are positive, and Tq_totRegen is the total regeneration torque supplied by the electric machine to the driveline (e.g., the rear drive unit electric machine and/or the integrated starter generator) to provide the regenerative torques applied to the first and second wheels. Method 400 proceeds to exit after applying the first and second half shaft regenerative braking torques.

At 410, method 400 determines the present torque of the eLSD clutch. In one example, where the eLSD itself applies and releases the eLSD clutch in response to half shaft speeds or other half shaft conditions, the eLSD outputs a torque of the eLSD clutch to the vehicle controller 12. The relationship between torque transferred by the differential clutch (e.g., differential clutch torque) and the torques on the driven axle half shafts is shown in the following equation:

$$Tq\_clutchTF = Trq\_high - Trq\_low$$

where Tq_clutchTF is the clutch torque, Trq_high is the one of the two driven wheels that exhibits a higher torque load (e.g., an outside wheel when the vehicle is negotiating a turn), and Trq_low is the one of two driven wheels that exhibits a lower torque load (e.g., an inside wheel when the vehicle is negotiating a turn).

In still other examples, a locking effect for a LSD clutch with helical gears may be described mathematically as:

$$Trq\_high = Trq\_low \cdot TBR$$

where Trq_high is the one of the two driven wheels that exhibits a higher torque load (e.g., an outside wheel when the vehicle is negotiating a turn), Trq_low is the one of two driven wheels that exhibits a lower torque load (e.g., an inside wheel when the vehicle is negotiating a turn), and TBR is a torque bias ratio that depends on clutch configuration. When the differential is open the regeneration torque is a same value at each wheel because it is defined by the wheel with the lower maximum torque. The regenerative braking torque may be increased when the differential clutch is applied or at least partially closed. The regenerative torque for the wheel with a lower torque is equal to the maximum torque of the lower torque wheel. The regenerative torque for the wheel with the higher or greater torque is equal to the maximum torque of the lower torque wheel plus the clutch torque. Method 400 proceeds to 412 after determined torque of the eLSD or LSD clutch.

At 412, method 400 judges if the maximum braking torque of the first wheel (e.g., the threshold torque of the first wheel) is less than (L.T.) a maximum braking torque of the second wheel (e.g., the threshold torque of the second wheel). If so, the answer is yes and method 400 proceeds to 420. Otherwise, the answer is no and method 400 proceeds to 414.

At 420, method 400 adjusts the regenerative braking torque of the first wheel to the maximum braking torque for the first wheel (e.g., the threshold torque of the first wheel). In addition, method 400 adjusts the regenerative braking torque of the second wheel to the minimum of the maximum braking torque of the first wheel plus the amount of torque the differential clutch may transfer (e.g., the present differential clutch torque) or the maximum braking torque of the second wheel. The electric machine in the driveline (e.g., 120 of FIG. 1A) provides a regenerative braking torque equal to the regenerative braking torque applied to the first half shaft plus the regenerative braking torque applied to the second half shaft. Mathematically the relationships may be expressed as:

$$Tq\_regen1 = Tq\_brakeMax1$$

$$Tq\_regen2 = min(Tq\_brakeMax1 + Tq\_clutchTF, Tq\_brakeMax2)$$

$$Tq\_totRegen = Tq\_regen1 + Tq\_regen2$$

where Tq_regen1 is the regenerative torque applied to the first wheel, Tq_regen2 is the regenerative torque applied to the second wheel, Tq_brakeMax1 is the maximum braking torque of the first wheel, Tq_brakeMax2 is the maximum braking torque of the second wheel, Tq_clutchTF is the amount of torque the differential clutch may transfer (e.g., the present differential clutch torque), min is a function that selects a minimum value (e.g., lower of the argument values) from the arguments, and Tq_totRegen is the total regenerative braking torque applied by the rear drive unit electric machine and/or the integrated starter/generator to the driveline to provide the regenerative torques applied to the first and second wheels. Method 400 proceeds to exit.

At 414, method 400 adjusts the regenerative braking torque of the second wheel to the maximum braking torque for the second wheel (e.g., the threshold torque of the second wheel). In addition, method 400 adjusts the regenerative braking torque of the first wheel to the minimum of the maximum braking torque of the second wheel plus the amount of torque the differential clutch may transfer (e.g., the present differential clutch torque) or the maximum braking torque of the first wheel. The electric machine in the driveline (e.g., 120 of FIG. 1A) provides a regenerative braking torque equal to the regenerative braking torque applied to the first half shaft plus the regenerative braking torque applied to the second half shaft. Mathematically the relationships may be expressed as:

$$Tq\_regen2 = Tq\_brakeMax2$$

$$Tq\_regen1 = min(Tq\_brakeMax2 + Tq\_clutchTF, Tq\_brakeMax1)$$

$$Tq\_totRegen = Tq\_regen1 + Tq\_regen2$$

where Tq_regen1 is the regenerative torque applied to the first wheel, Tq_regen2 is the regenerative torque applied to the second wheel, Tq_brakeMax1 is the maximum braking torque of the first wheel, Tq_brakeMax2 is the maximum braking torque of the second wheel, min is a function that selects a minimum of the arguments, Tq_clutchTF is the amount of torque the differential clutch may transfer (e.g., the present differential clutch torque), and Tq_totRegen is the total regenerative braking torque applied by the electric machine to the driveline to provide the regenerative torques applied to the first and second wheels. Method 400 proceeds to exit.

In this way, method 400 may adjust regenerative braking torque provided via an electric machine in the driveline (e.g., 142 or 120 of FIG. 2) to improve conversion of a vehicle's kinetic energy into electrical energy. Further, method 400 may increase regenerative braking without locking drive wheels during braking. Further still, method 400 adjusts the regenerative braking amount in response to a torque of a differential clutch (e.g., a clutch in the differential that may be selectively applied to reduce the possibility of wheel slip).

Referring now to FIG. 5, a second example method for operating a hybrid driveline to increase conversion of a vehicle's kinetic energy into electrical energy is shown. The method of FIG. 5 may be incorporated into and may cooperate with the system of FIGS. 1A-3. Further, at least portions of the method of FIG. 5 may be incorporated as executable instructions stored in non-transitory memory while other portions of the method may be performed via a controller transforming operating states of devices and actuators in the physical world.

At 502, method 500 judges if a vehicle brake pedal is applied or if an autonomous controller is requesting vehicle braking. Method 500 may judge that a vehicle brake pedal is applied in response to a position of a brake pedal. Method 500 may judge if vehicle braking is being requested in response to a value of a parameter in controller memory. If method 500 judges that a brake pedal is applied, the answer is yes and method 500 proceeds to 504. Otherwise, the answer is no and method 500 returns to 502.

At 504, method 500 determines a coefficient of friction between a tire and a road surface. In addition, method 500 determines normal forces for each wheel that may participate in regenerative braking. For example, wheels 131 shown in FIG. 1A may participate in regenerative braking since wheels 131 are shown in mechanical communication with electric machine 120 via half shaft 122. In one example, the coefficient of friction between the tire and the road surface may be determined as is described in U.S. Pat. No. 4,794,538 which is hereby fully incorporated by reference for all purposes.

In one example, the normal forces are determined via strain gauges located at each driven wheel. Alternatively, the normal forces for driven wheels including a predetermined number of passengers and fuel may be stored to memory and adjusted as a function of lateral and longitudinal acceleration to determine normal forces applied to driven wheels. For example, normal force applied to a right rear wheel may be mathematically described as:

$$RR_N = f(Vm, Lat\_a, Long\_a, Hcg, Wb, Tw)$$

where $RR_N$ is right rear wheel normal load, $f$ is a function that outputs a value of right rear wheel normal load, argument Vm is vehicle mass, argument Lat_a is lateral acceleration as determined via a sensor, argument Long_a is longitudinal acceleration as determined via a sensors, argument Hcg is height of center of gravity as empirically determined and stored to memory, argument Wb is the vehicle's wheel base as measured, and argument Tw is the vehicle's track width as measured. Values in the function $f$ may be empirically determined and stored to memory. The left rear wheel normal load may be determined in a similar way.

Method 500 proceeds to 506 after determining the coefficient of friction and the normal forces for each wheel that may participate in regenerative braking by transferring vehicle kinetic energy to the electric machine.

At 506, method 500 determines a maximum braking torque available for each wheel that may participate in regenerative braking (e.g., driven wheels 131 of FIG. 1A). The maximum braking torque for a left rear driven wheel may be referred to as a first threshold braking torque (Tq_brakeMax1). The maximum braking torque for a right rear driven wheel may be referred to as a second threshold braking torque (Tq_brakeMax2). In one example, method 400 determines the first threshold braking torque as a function of mu and left rear wheel normal load. The first threshold braking torque may be expressed mathematically as:

$$LR_{Max\_brake} = f(LR_N, mu, R)$$

where $LR_{Max\_brake}$ is left rear wheel maximum or high threshold brake torque, $f$ is a function that outputs a value of left rear wheel maximum braking torque, argument $LR_N$ is left rear wheel normal load, argument mu is a coefficient of friction determined as previously discussed, and R is tire radius. Values in the function $f$ may be empirically determined and stored to memory. The right rear wheel maximum braking torque may be determined via:

$$RR_{Max\_brake} = f(RR_N, mu, R)$$

where $RR_{Max\_brake}$ is right rear wheel maximum or high threshold brake torque and argument $RR_N$ is right rear wheel normal load, argument mu is a coefficient of friction determined as previously described, and R is tire radius. The remaining variables are as previously described. Method 500 proceeds to 508 after determining the first threshold braking torque and the second threshold braking torque.

At 508, method 500 determines a difference between a potential regenerative braking torque request and the maximum braking torque available at the wheels. Method 500 determines an electric machine torque limit or high threshold. In one example, the electric machine torque limit or high threshold may be a function of electric machine temperature. The electric machine maximum torque limit or high threshold electric machine may be determined via indexing a table or function of empirically determined electric machine torque limit values using electric machine temperature. The table or function outputs an electric machine regenerative torque limit (Tq_motlim) that is an electric machine regenerative torque that is not to be exceeded. Alternatively, method 500 may receive an electric machine torque limit or high threshold from an electric machine controller.

Method 500 also determines a battery or electrical energy storage device charging power limit in the driveline torque domain. A battery or electrical energy storage device may not have capacity to accept more than a threshold amount of current produced by an amount of regenerative current. For example, if a battery is at a high state of charge, the battery may be able to sink a small amount of current produced via a small amount of regenerative torque input to the electrical machine. In one example, the battery torque limit may be a function of battery state of charge. The battery based torque limit or high threshold battery torque limit may be determined via indexing a table or function of empirically determined battery torque limit values using battery state of charge. The table or function outputs a battery regenerative torque amount limit (Tq_battChrglim) that is a battery torque that is not to be exceeded. The battery torque may correspond to an amount of current the battery may sink during regenerative braking.

Method 500 also determines a driver requested brake torque (Tq_brkReq). In one example, output of a brake position sensor is input to a table or function of empirically determined brake request values. The table or function outputs the driver requested brake torque based on brake pedal position. A potential regenerative torque request is determined by taking a minimum of the electric machine regenerative torque limit, the battery regenerative torque limit, and the driver requested brake torque. The potential regenerative torque request may be expressed mathematically as:

$$Tq\_regenReq=min(Tq\_motlim, TqbattChagLim, Tq\_brkReq)$$

where Tq_regenReq is the potential regenerative torque request and min is a function that selects a minimum value from the arguments and it assumes the arguments are positive in sign. Method 500 also determines a torque difference between the potential regenerative torque request and the first and second threshold braking torques. The difference may be expressed mathematically as:

$$Tq\_diff=Tq\_regenReq-(2*min(Tq\_brakeMax1, Tq\_brakeMax2))$$

where Tq_diff is the torque difference between the potential regenerative torque request, Tq_brakeMax1 is the maximum braking torque of the first wheel, Tq_brakeMax2 is the maximum braking torque of the second wheel, and min is a function that selects a minimum of the arguments. Method 500 proceeds to 510 after the torque difference is determined.

At 510, method 500 judges if a value of the torque difference Tq_diff is less than or equal to a value of zero. If so, the answer is yes and method 500 proceeds to 522. Otherwise, the answer is no and method 500 proceeds to 512.

At 522, method 500 holds the eLSD in an open state where the torque of the differential's clutch is zero. In addition, method 500 adjusts the regenerative torque applied to the first wheel (Tq_regen1) and the regenerative torque applied to the second wheel (Tq_regen2) to half the requested regenerative braking torque respectively. The regenerative torques may be mathematically described as:

$$Tq\_regen1=Tq\_regen2=0.5*Tq\_regenReq$$

$$Tq\_totRegen=Tq\_regen1+Tq\_regen2$$

The rear drive unit electric machine torque and/or integrated starter/generator torque is adjusted to the value of Tq_totRegen to provide the requested brake torque. Method 500 proceeds to exit.

At 512, method 500 judges if maximum braking torque of the first wheel (Tq_brakeMax1) is equal to or substantially equal (e.g., within 20 Nm) to maximum braking torque of the second wheel (Tq_brakeMax2). If so, the answer is yes and method 500 proceeds to 524. Otherwise, the answer is no and method 500 proceeds to 514.

At 524, method 500 holds the eLSD in an open state where the torque of the differential's clutch is zero. In addition, method 500 adjusts the regenerative torque applied to the first wheel (Tq_regen1) to the maximum braking torque of the first wheel, and method 500 adjusts the regenerative torque applied to the second wheel (Tq_regen2) to the maximum braking torque of the second wheel. The regenerative torques may be mathematically described as:

$$Tq\_regen1=Tq\_brakeMax1$$

$$Tq\_regen2=Tq\_brakeMax2$$

$$Tq\_totRegen=Tq\_regen1+Tq\_regen2$$

The electric machine torque is adjusted to the value of Tq_totRegen to provide the requested brake torque. Method 500 proceeds to exit.

At 514, method 500 determines a request for an amount of torque to transfer through the differential's clutch or the torque the differential clutch is requested to transfer. In one example, method 500 may determine a maximum torque the differential clutch may transfer (Tq_clutchMax) by accessing an empirically determined value that is stored in controller memory. In one example, the maximum torque the differential clutch may transfer may be expressed mathematically as:

$$Tq\_clutchMax=f(clutch\_cfg, clutch\_temp)$$

where Tq_clutchMax is the maximum or high threshold of torque the differential clutch may transfer, $f$ is a function of empirically determined maximum torques the differential clutch may transfer, clutch_cfg is the differential clutch configuration, and clutch_temp is the differential clutch's temperature.

Method 500 also determines a difference in between the maximum braking torque of the second wheel and maximum braking torque of the first wheel (Tq_RLdiff). The amount of torque the differential clutch may be requested to transfer is determined by taking a minimum or lower value of the maximum torque the differential clutch may transfer, the torque difference between the potential regenerative torque request, and the difference in between the maximum braking torque of the second wheel and maximum braking torque of the first wheel. The torque that the differential clutch may tranfer may be mathematically described from the following equations:

$Tq\_RLdiff = abs(Tq\_brakeMax2 - Tq\_brakeMax1)$ $Tq\_clutchTFReq = min(Tq\_clutchMax, Tq\_RLdiff, Tq\_diff)$ where Tq_RLdiff is a difference in between the maximum braking torque of the second wheel and maximum braking torque of the first wheel, abs is a function that takes an absolute value of the arguments, Tq_clutchTFReq is the torque the differential clutch is requested to transfer, and the other variables are as previously described. Method 500 proceeds to 516.

At 516, method 500 judges if the maximum braking torque for the first wheel is less than the maximum braking torque for the second wheel (e.g., Tq_brakeMax1< Tq_brakeMax2). If so, the answer is yes and method 500 proceeds to 518. Otherwise, the answer is no and method 500 proceeds to 530.

At 518, method 500 commands the differential clutch torque to the value of Tq_clutchTFReq so as to improve transfer of the vehicle's kinetic energy to the electric machine. In addition, method 500 adjusts the regenerative braking torque of the first wheel to the maximum braking torque for the first wheel (e.g., the threshold torque of the first wheel). In addition, method 500 adjusts the regenerative braking torque of the second wheel to the maximum braking torque of the first wheel plus the torque the differential clutch is requested to transfer. The electric machine in the driveline (e.g., 120 of FIG. 1A) provides a regenerative braking torque equal to the regenerative braking torque applied to the first half shaft plus the regenerative braking torque applied to the second half shaft. Mathematically the relationships may be expressed as:

$Tq\_regen1 = Tq\_brakeMax1$ $Tq\_regen2 = Tq\_brakeMax1 + Tq\_clutchTFReq$ $Tq\_totRegen = Tq\_regen1 + Tq\_regen2$ where Tq_regen1 is the regenerative torque applied to the first wheel, Tq_regen2 is the regenerative torque applied to the second wheel, Tq_brakeMax1 is the maximum braking torque of the first wheel, Tq_brakeMax2 is the maximum braking torque of the second wheel, Tq_clutchTFReq is the torque the differential clutch is requested to transfer, and Tq_totRegen is the total regenerative braking torque applied by the rear drive unit electric machine and/or integrated starter generator to the driveline to provide the regenerative torques applied to the first and second wheels. Method 500 proceeds to exit.

At 530, method 500 commands the differential clutch torque to the value of Tq_clutchTFReq so as to improve transfer of the vehicle's kinetic energy to the electric machine. In addition, method 500 adjusts the regenerative braking torque of the second wheel to the maximum braking torque for the second wheel (e.g., the threshold torque of the second wheel). In addition, method 500 adjusts the regenerative braking torque of the first wheel to the maximum braking torque of the second wheel plus the torque that the differential clutch is requested to transfer. The electric machine in the driveline (e.g., 120 of FIG. 1A) provides a regenerative braking torque equal to the regenerative braking torque applied to the first half shaft plus the regenerative braking torque applied to the second half shaft. Mathematically the relationships may be expressed as:

$Tq\_regen2 = Tq\_brakeMax2$ $Tq\_regen1 = Tq\_brakeMax2 + Tq\_clutchTFReq$ $Tq\_totRegen = Tq\_regen1 + Tq\_regen2$ where Tq_regen1 is the regenerative torque applied to the first wheel, Tq_regen2 is the regenerative torque applied to the second wheel, Tq_brakeMax1 is the maximum braking torque of the first wheel, Tq_brakeMax2 is the maximum braking torque of the second wheel, Tq_clutchTFReq is the torque that the differential clutch is requested to transfer, and Tq_totRegen is the total regenerative braking torque applied by the electric machine to the driveline to provide the regenerative torques applied to the first and second wheels. Method 500 proceeds to exit.

In this way, method 500 may command the torque of the differential clutch and the regenerative torque of each wheel to improve conversion of the vehicle's kinetic energy into electrical energy. This method may be especially effective when a vehicle enters a turn or is operating on a road having split coefficient of friction (e.g., coefficient of friction for a portion of road under a first wheel is different from a coefficient of friction for a portion of road under a second wheel).

Thus, the methods described herein provide for a driveline method, comprising: adjusting a clutch torque of a differential (e.g., a torque a differential's clutch transfers) in response to a difference between a second wheel braking torque and the first wheel braking torque; and adjusting an electric machine regenerative torque in response to the first wheel braking torque and the first wheel braking torque plus the torque a differential clutch is requested to transfer. The method includes where the first wheel braking torque and the second wheel braking torque are a function of a road surface coefficient of friction, where the first wheel braking torque is a function of a normal load on the first wheel, and where the second wheel braking torque is a function of a normal load on the second wheel.

In some examples, the method includes where the clutch transfer torque requested is a minimum of a threshold clutch transfer torque, a difference between the second wheel braking torque and the first wheel braking torque, and regenerative torque request minus a lesser of the first wheel braking torque and the second wheel braking torque multiplied by a value of two. The method includes where commanding the electric machine regeneration torque includes commanding a rear drive unit electric machine and an integrated starter/generator. The method includes where the electric machine is directly coupled to a rear axle of a vehicle. The method includes where the clutch transfer torque is commanded to zero in response to the difference between the second threshold braking torque and the first braking torque being substantially zero (e.g., less than 20 Nm). The method further comprises commanding the clutch transfer torque of the differential to zero in response to a desired regeneration torque being less than two times a lower of the first wheel braking torque or the second wheel braking torque.

The method of FIGS. 4 and 5 also provides for a driveline operating method, comprising: adjusting an electric machine regenerative torque to a value multiplied by two in response to an electronic limited slip differential not being activated;

and adjusting the electric machine regenerative torque to a value of a sum of a first wheel braking torque and the first wheel braking torque and a clutch torque (e.g., an amount of torque a clutch is presently transferring) in response to the electronic limited slip differential being activated. The method includes where the clutch torque is a torque an electronic limited slip differential may transfer. The method includes where the clutch torque of the electronic limited slip differential is zero when the electric limited slip differential is not activated. The method further comprises adjusting the regenerative torque of the electric machine (e.g., torque provided via the electric machine when the electric machine is providing charge to a battery) to a sum of a second wheel braking torque and the second braking torque and the clutch torque. The method further comprises estimating the first wheel braking torque in response to a road coefficient of friction and a normal load of a wheel.

In some examples, the method further comprises estimating the second wheel braking torque in response to a road coefficient of friction and a normal load of a wheel. The method includes where the value multiplied by two in response to an electronic limited slip differential not being activated is a lower value of the first wheel braking torque and a second wheel braking torque. The method includes where adjusting the electric machine regenerative torque includes adjusting a regenerative torque of an electric machine that is directly coupled to an axle.

Referring now to FIG. 6, a prophetic regenerative braking sequence according to the method of FIG. 4 is shown. The sequence of FIG. 6 may be provided via the method of FIG. 4 operating in conjunction with the system of FIGS. 1A-3.

The first plot from the top of FIG. 6 is a plot of electrically controlled limited slip differential (eLSD) operating state versus time. The eLSD may be in an active state indicated by a"ACTIVE" or in a deactivated state indicted by "ACTIVE" bar along the vertical axis. The horizontal axis represents time and time increases from the left side of the figure to the right side of the figure.

The second plot from the top of FIG. 6 is a plot of maximum braking torque for a first driven wheel versus time. The vertical axis represents the maximum or threshold not to be exceeded braking torque and the maximum braking torque increases in the direction of the vertical axis arrow. The horizontal axis represents time and time increases from the left side of the figure to the right side of the figure.

The third plot from the top of FIG. 6 is a plot of maximum braking torque for a second driven wheel versus time. The vertical axis represents the maximum or threshold not to be exceeded braking torque and the maximum braking torque increases in the direction of the vertical axis arrow. The horizontal axis represents time and time increases from the left side of the figure to the right side of the figure.

The fourth plot from the top of FIG. 6 is a plot of regenerative braking torque for the first driven wheel versus time. The vertical axis represents regenerative braking torque for the first wheel and regenerative braking torque for the first wheel increases in the direction of the vertical axis arrow. The horizontal axis represents time and time increases from the left side of the figure to the right side of the figure.

The fifth plot from the top of FIG. 6 is a plot of regenerative braking torque for the second driven wheel versus time. The vertical axis represents regenerative braking torque for the second wheel and regenerative braking torque for the second wheel increases in the direction of the vertical axis arrow. The horizontal axis represents time and time increases from the left side of the figure to the right side of the figure.

The sixth plot from the top of FIG. 6 is a plot of eLSD differential clutch torque (e.g., a present clutch transfer torque or an amount of torque the differential clutch may transfer, and the present clutch transfer torque may vary depending on a force applied to close the differential clutch) versus time. The vertical axis represents eLSD differential clutch torque and clutch torque increases in the direction of the vertical axis arrow. The horizontal axis represents time and time increases from the left side of the figure to the right side of the figure.

At time T0, the eLSD state trace 602 indicates that the eLSD is active. The eLSD may adjust torque transmitted between the first driven wheel and the second driven wheel when the eLSD is active. The maximum braking torque for the first wheel is at a higher level as indicated by trace 604. The maximum braking torque for the second wheel is also at a higher level as indicated by trace 606. The regenerative braking torque for the first wheel is zero as indicated by trace 608. The regenerative braking torque for the second wheel is zero as indicated by trace 610. Torque transferred via the differential clutch is zero as indicated by trace 612. These conditions are indicative of a vehicle traveling in a straight line at a cruising speed.

At time T1, the vehicle begins to enter a turn where the first wheel is the inside wheel (e.g., the wheel traveling a lesser distance through the turn) and the second wheel is the outside wheel (e.g., the wheel traveling a greater distance through the turn). Braking is requested as the vehicle enters the turn as indicated by the first wheel regenerative braking torque increasing to a higher level and the second wheel regenerative braking torque increasing to a higher level. The eLSD torque (e.g., amount of torque the differential clutch may transfer from its input side to its output side) also begins to increase as the vehicle enters the turn. The maximum braking torque for the first and second wheels remains at a high level.

Between time T1 and time T2, the eLSD remains active and the maximum braking torque for the first wheel and second wheel decreases. The maximum braking torque for the first wheel is less than the maximum braking torque for the second wheel because it is the inside wheel for the turn and vehicle weight is transferred from the inside wheel to the outside wheel. In addition, the maximum braking torque for both the inside wheel and outside wheel is reduced as vehicle weight is transferred to the vehicle's front wheels (not shown). The regenerative braking torque for the first wheel increases in response to a request for increased braking entering the turn (not shown) and then it decreases following the maximum braking torque for the first wheel. Similarly, the regenerative braking torque for the second wheel increases in response to a request for increased braking entering the turn (not shown) and then it decreases following the maximum braking torque for the first wheel plus torque transferred via the differential clutch. The eLSD torque increases to transfer torque to the second wheel.

At time T2, the vehicle begins exiting the turn and the braking request is removed as indicated by the regenerative braking torque for the first and second wheels returning to zero. The maximum braking torque for the first and second wheels begins to increase as the vehicle exits the turn and stops decelerating. Further, the eLSD clutch torque begins to be reduced as the vehicle exits the turn.

At time T3, the vehicle completely exits the turn and resumes driving in a straight path. The maximum braking torque for the first wheel and the second wheel returns to their respective levels before time T1. The regenerative braking torques for the first and second wheels remains at zero and the eLSD torque is zero which provides for an open differential and equal torque delivery to the first and second wheels. The eLSD continues to remain active.

Between time T3 and time T4, the eLSD is deactivated so that the differential clutch does not transfer torque. The maximum braking torque for the first wheel and the second wheel remain at higher levels. The regenerative braking torque for the first and second wheels remains at zero and the eLSD clutch torque is zero.

At time T4, the vehicle begins to enter a second turn where the first wheel is again the inside wheel and the second wheel is the outside wheel. Braking is requested as the vehicle enters the turn as indicated by the first wheel regenerative braking torque increasing to a higher level and the second wheel regenerative braking torque increasing to a higher level. The eLSD torque remains at zero since the eLSD is deactivated. The maximum braking torque for the first and second wheels remains at a higher level.

Between time T4 and time T5, the eLSD remains deactivated and the maximum braking torque for the first wheel and second wheel decreases. The maximum braking torque for the first wheel is less than the maximum braking torque for the second wheel because it is the inside wheel for the turn and vehicle weight is transferred from the inside wheel to the outside wheel. In addition, the maximum braking torque for both the inside wheel and outside wheel is reduced as vehicle weight is transferred to the vehicle's front wheels (not shown). The regenerative braking torque for the first wheel increases in response to a request for increased braking entering the turn (not shown) and then it decreases following the maximum braking torque for the first wheel. Similarly, the regenerative braking torque for the second wheel increases in response to a request for increased braking entering the turn (not shown) and then it decreases following the maximum braking torque for the first wheel since the differential is open which equalizes the torque capacity of the first wheel and the second wheel to the lower maximum braking torque of the first and second wheel. The eLSD torque remains zero.

At time T5, the vehicle begins exiting the turn and the braking request is removed as indicated by the regenerative braking torque for the first and second wheels returning to zero. The maximum braking torque for the first and second wheels begins to increase as the vehicle exits the turn and stops decelerating. The eLSD clutch torque remains at zero.

In this way, regenerative braking torque to driven wheels may be adjusted responsive to a lower maximum braking torque of two driven wheels. Further, the regenerative braking torque of the outer wheel going through the turn may be increased to increase an amount of charge supplied to the vehicle's battery or electric energy storage device.

Referring now to FIG. 7, a prophetic regenerative braking sequence according to the method of FIG. 5 is shown. The sequence of FIG. 7 may be provided via the method of FIG. 5 operating in conjunction with the system of FIGS. 1A-3. The plots shown in FIG. 7 are of the same variables shown in FIG. 6. Therefore, for the sake of brevity a description of the plots is omitted.

At time T10, the eLSD state trace 702 indicates that the eLSD is not active. In this example, the eLSD may be activated and deactivated responsive to driving conditions and the method of FIG. 5. The maximum braking torque for the first wheel is at a higher level as indicated by trace 704. The maximum braking torque for the second wheel is also at a higher level as indicated by trace 706. The regenerative braking torque for the first wheel is zero as indicated by trace 708. The regenerative braking torque for the second wheel is zero as indicated by trace 710. Torque transferred via the differential clutch is zero as indicated by trace 712. These conditions are indicative of a vehicle traveling in a straight line at a cruising speed.

At time T11, the vehicle begins to enter a turn where the first wheel is the inside wheel and the second wheel is the outside wheel. Braking is requested as the vehicle enters the turn as indicated by the first wheel regenerative braking torque increasing to a higher level and the second wheel regenerative braking torque increasing to a higher level. The eLSD is activated shortly after braking is requested but eLSD may be activated in response to the vehicle's lateral acceleration too. The eLSD differential clutch torque request begins to increase as the vehicle enters the turn. The maximum braking torque for the first and second wheels remains at a high level.

Between time T11 and time T12, the eLSD remains active and the maximum braking torque for the first wheel and second wheel decreases. The maximum braking torque for the first wheel is less than the maximum braking torque for the second wheel because it is the inside wheel for the turn and vehicle weight is transferred from the inside wheel to the outside wheel. Further, the maximum braking torque for both the inside wheel and outside wheel is reduced as vehicle weight is transferred to the vehicle's front wheels (not shown). The regenerative braking torque for the first wheel increases in response to a request for increased braking entering the turn (not shown) and then it decreases following the maximum braking torque for the first wheel. Similarly, the regenerative braking torque for the second wheel increases in response to a request for increased braking entering the turn (not shown) and then it decreases following the maximum braking torque for the first wheel plus torque transferred via the differential clutch. The eLSD torque request increases to transfer torque to the second wheel.

At time T12, the vehicle begins exiting the turn and the braking request is removed as indicated by the regenerative braking torque for the first and second wheels returning to zero. The maximum braking torque for the first and second wheels begins to increase as the vehicle exits the turn. Further, the eLSD clutch torque request begins to be reduced as the vehicle exits the turn.

At time T13, the vehicle completely exits the turn and resumes driving in a straight path. The maximum braking torque for the first wheel and the second wheel returns to their respective levels before time T11. The regenerative braking torques for the first and second wheels remains at zero and the eLSD torque request returns to zero, which provides for an open differential and equal torque delivery to the first and second wheels. The eLSD is deactivated in response to exiting the turn.

In this way, an eLSD may be activated and deactivated in response to a vehicle entering and exiting a turn. The regenerative braking torque of the driven wheels may be adjusted in response to the torque the eLSD differential clutch is requested to transfer to improve an amount of charge supplied to a vehicle electric energy storage device while the vehicle negotiates the turn.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline method, comprising:
adjusting a clutch torque of a differential's clutch in response to a difference between a second wheel braking torque and a first wheel braking torque; and
adjusting an electric machine regenerative torque in response to the first wheel braking torque and the first wheel braking torque and the clutch torque.

2. The method of claim 1, where the first wheel braking torque and the second wheel braking torque are a function of a road surface coefficient of friction, where the first wheel braking torque is a function of a normal load on a first wheel and the second wheel braking torque is a function of a normal load on a second wheel.

3. The method of claim 1, where the clutch torque is a lower value of a threshold clutch torque, the difference between the second wheel braking torque and the first wheel braking torque, and a regenerative torque request minus a lesser of the first wheel braking torque and the second wheel braking torque multiplied by a value of two.

4. The method of claim 1, where adjusting the electric machine regenerative torque includes commanding a rear drive unit electric machine and an integrated starter/generator.

5. The method of claim 1, where an electric machine is directly coupled to a rear axle of a vehicle.

6. The method of claim 1, where the clutch torque is commanded to zero in response to the difference between the second wheel braking torque and the first wheel braking torque being substantially zero.

7. The method of claim 1, further comprising commanding the clutch torque of the differential's clutch to zero in response to a desired regeneration torque being less than two times a lower of the first wheel braking torque or the second wheel braking torque.

8. A driveline operating method, comprising:
adjusting an electric machine regenerative torque to a value multiplied by two in response to an electronic limited slip differential not being activated; and
adjusting the electric machine regenerative torque to a value of a sum of a first wheel braking torque and the first wheel braking torque and a clutch torque of the electronic limited slip differential's clutch in response to the electronic limited slip differential being activated.

9. The method of claim 8, where the clutch torque of the electronic limited slip differential's clutch is zero when the electric limited slip differential is not activated.

10. The method of claim 8, further comprising adjusting the regenerative torque of the electric machine to a sum of the first wheel braking torque and a second wheel braking torque plus the clutch torque.

11. The method of claim 10, further comprising estimating the first wheel braking torque in response to a road coefficient of friction and a normal load of a wheel.

12. The method of claim 10, further comprising estimating the second wheel braking torque in response to a road coefficient of friction and a normal load of a wheel.

13. The method of claim 8, where the value multiplied by two in response to the electronic limited slip differential not being activated is a lower value of the first wheel braking torque and a second wheel braking torque.

14. The method of claim 8, where adjusting the electric machine regenerative torque includes adjusting a regenerative torque of an electric machine that is directly coupled to an axle.

15. A system, comprising:
an engine;
a dual clutch transmission coupled to the engine via a driveshaft;
a rear drive unit including an electrically controlled limited slip differential, the rear drive unit coupled to the dual clutch transmission;
an electric machine directly coupled to the rear drive unit; and
a controller including executable instructions stored in non-transitory memory to adjust a torque of the limited slip differential in response to a requested electric machine regenerative torque and a first wheel braking torque.

16. The system of claim 15, further comprising additional instructions to command the torque to zero in response to the requested electric machine regenerative torque minus a value of two multiplied by the first wheel braking torque being less than zero.

17. The system of claim 15, further comprising additional instructions to command the torque to zero in response to the first wheel braking torque being substantially equal to a second wheel braking torque.

18. The system of claim 17, where the first wheel braking torque and the second wheel braking torque are a function of a road surface coefficient of friction, where the first wheel braking torque is a function of a normal load on a first wheel and the second wheel braking torque is a function of a normal load on a second wheel.

19. The system of claim 15, where the requested electric machine regenerative torque is based on a brake pedal input.

* * * * *